United States Patent [19]
Watson

[11] 4,124,503
[45] Nov. 7, 1978

[54] MAGNETIC SEPARATORS, APPARATUS AND METHOD

[75] Inventor: James H. P. Watson, St. Austell, England

[73] Assignee: English Clays Lovering Pochin & Co. Limited, Cornwall, England

[21] Appl. No.: 690,935

[22] Filed: May 28, 1976

[30] Foreign Application Priority Data

May 29, 1975 [GB] United Kingdom ............... 23522/75
Jan. 7, 1976 [GB] United Kingdom ................... 887/76

[51] Int. Cl.[2] ............................................. B01D 17/06

[52] U.S. Cl. .................................. 210/42 S; 209/222; 209/232; 210/222

[58] Field of Search ................. 209/214, 232, 224, 39, 209/38; 55/100; 210/222, 223, 42

[56] References Cited

U.S. PATENT DOCUMENTS

| | | | |
|---|---|---|---|
| 968,822 | 8/1910 | Weinland | 210/324 |
| 1,491,600 | 4/1924 | Ternow | 210/222 |
| 1,527,070 | 2/1925 | Peck | 209/220 |
| 2,326,484 | 8/1943 | Moreton | 210/334 |
| 2,452,220 | 10/1948 | Bower | 210/222 |
| 3,567,026 | 3/1971 | Kolm | 210/222 |
| 3,627,678 | 12/1971 | Marston et al. | 210/42 |
| 3,770,629 | 11/1973 | Nolan | 209/232 |
| 3,887,457 | 6/1975 | Marston et al. | 209/232 |
| 3,902,994 | 9/1975 | Maxwell et al. | 209/232 |
| 3,912,634 | 10/1975 | Howell | 210/222 |
| 3,920,543 | 11/1975 | Marston et al. | 210/222 |
| 3,984,309 | 10/1976 | Allen et al. | 209/214 |

*Primary Examiner*—Theodore A. Granger
*Attorney, Agent, or Firm*—Armstrong, Nikaido, Marmelstein & Kubovcik

[57] ABSTRACT

Apparatus and method for magnetic separation. A magnetic field is established in a first zone by a magnet. Fluid containing magnetizable particles is passed through a separating chamber disposed in the first zone. The separating chamber comprises a rigid elongate canister having an inlet and an outlet for fluid, at least two fluid-permeable partitions dividing the space within the canister into several compartments, each of which extends substantially the full length of the canister, and a packing of magnetizable material disposed between the partitions. The form and disposition of the canister, the partitions and the packing material is such that the fluid flows from the inlet, through the packing material in a direction transverse to the axis of the canister, to the outlet, and the linear velocity of the fluid decreases as it passes through the packing material. As the fluid passes through the separating chamber, magnetizable particles within the fluid are magnetized and attracted to the packing material. The separating chamber is then moved out of the first zone into a second zone, out of the influence of the magnetic field, and the magnetizable particles are removed from the separating chamber.

23 Claims, 6 Drawing Figures

MAGNETIC SEPARATORS, APPARATUS AND METHOD

This invention relates to magnetic separation, and more particularly to apparatus for, and a method of, separating magnetisable particles from a fluid in which they are suspended.

BACKGROUND OF THE INVENTION

Magnetic filters have been used for many years for separating strongly magnetisable particles, for example ferromagnetic particles, from a liquid. Such magnetic filters are described in U.S. Pat. No. 3,326,374, British patent specification No. 1,059,635 and British patent specification No. 1,204,324. More recently, however, much interest has been shown in apparatus for separating more weakly magnetisable particles, for example paramagnetic particles, from a mixture of solids and liquids, for example a clay slurry. In German Offenlegungsschrift No. 24 33 008, there is described such apparatus for separating magnetisable particles from a fluid in which they are suspended, which apparatus comprises one or more separating chambers movable into, and out of, a first zone and a magnet, possibly a superconducting magnet, which is intended to establish a continuous magnetic field in the first zone when the apparatus is in use. Each separating chamber comprises a canister provided with an inlet for feed slurry (which comprises magnetisable particles in suspension in a fluid) and an outlet for treated slurry, and a liquid-permeable packing of magnetisable material of approximately uniform density and approximately uniform cross-sectional area disposed within the cannister between the inlet and the outlet. The packing material may be paramagnetic or ferromagnetic and may be in particulate or filamentary form or even in the form of a foam-like material. For example the packing material may be constituted by ferromagnetic spherules, pellets or more irregularly shaped particles of ferromagnetic material, such as filings or chippings; or ferromagnetic wool, such as steel wool; or ferromagnetic wire mesh; or ferromagnetic wires or filaments packed individually or in bundles.

When a suitable feed slurry is passed through a separating chamber containing packing material in one of the forms described above, the separating chamber being positioned in the first zone in which a magnetic field is established, the magnetisable particles in the slurry are magnetised and captured in the packing material. When the quantity of magnetisable particles in the treated slurry leaving the outlet of the separating chamber reaches an unacceptably high level, the flow of feed slurry through the separating chamber is stopped and the separating chamber is moved to a second zone, out of the influence of the magnetic field, where the magnetisable particles captured in the packing material are removed, for example by flushing the separating chamber with water at high pressure. If the apparatus comprises two separating chambers, feed slurry may be passed through one separating chamber in the first zone whilst magnetisable particles are being removed from the other separating chamber in the second zone, the positions of the separating chambers subsequently being reversed. In this way feed slurry may be supplied to the apparatus continuously, except when the separating chambers are actually being moved.

In order that as large a proportion as possible of the separation cycle is spent productively, that is in actually treating slurry, the length of time for which the feed slurry is passed through each separating chamber should be long in comparison to the length of time which it takes to reverse the positions of the separating chambers. During the former time as large a quantity of feed slurry as possible should be passed through the separating chamber before it is necessary to regenerate the packing material. However, in practice, the slurry will contain magnetisable particles of different sizes and different magnetic susceptibilities. Thus the magnetisable particles will not be captured evenly throughout the packing material. In fact, when the feed slurry first enters the separating chamber, the magnetisable particles are initially captured mainly in the first part of the packing material encountered by the slurry. When this part of the packing material is substantially completely filled, those parts of the packing material further downstream are progressively filled. However, those magnetisable particles which are difficult to capture, that is the small and/or weakly magnetisable particles, tend to pass some way through the packing material before they are captured. A proportion of the magnetisable particles will even pass completely through the packing material without being captured. It is therefore advantageous if the packing material is as long as possible consistent with the dimensions of the magnetic field. However, as the packing material begins to fill up with magnetisable material in the upstream regions, the proportion of magnetisable particles passing completely through the packing material will increase. When this proportion has increased to an unacceptably high level, the packing material will require regeneration. However, only those collecting sites in the upstream regions of the packing material will have been substantially completely filled. In order that as large a quantity of feed slurry as possible may be passed through the separating chamber, it is advantageous for the cross-section of the packing material transverse to the direction of flow of the slurry to be as large as possible. However, this dimension is again limited by the dimensions of the magnetic field. Furthermore, the probability of a particular magnetisable particle being captured in the packing material is approximately inversely proportional to the linear velocity of the slurry through the packing material, other factors being equal. Therefore the rate at which the feed slurry is passed through the separating chamber may not be increased above a certain value if the capture of the small and/or more weakly magnetisable particles is not to suffer. It may therefore be seen that the quantity of feed slurry passed through each separating chamber during each cycle is limited by a number of factors.

SUMMARY OF THE INVENTION

According to a first aspect of the invention, there is provided apparatus, suitable for separating magnetisable particles from a fluid in which they are suspended, which apparatus comprises:

(a) a magnet for establishing a magnetic field in a first zone;

(b) a separating chamber which comprises:

(i) an elongate canister having an inlet and an outlet for a fluid, (ii) at least two fluid-permeable partitions disposed within the canister so as to divide the space within the canister into several compartments, each of which extends substantially the full length of the canister, and (iii) a fluid permeable packing of magnetisable material disposed within the canister between the partitions, the form and disposition of the canister, the partitions and the packing material being such that fluid supplied to the inlet flows through the packing material in a general direction transverse to the axis of the canister and exits through the outlet, and the linear velocity of the fluid decreases as it passes through the packing material;

(c) means for supplying fluid having magnetisable particles suspended therein to the inlet of the separating chamber, when the separating chamber is disposed within the first zone, and a magnetic field is established in the first zone, so that magnetisable particles are magnetised by the magnetic field and attracted to the packing material, whilst the fluid passes through the packing material and exits through the outlet;

(d) means for moving the separating chamber out of the first zone into a second zone out of the influence of the magnetic field of the first zone; and (e) means for removing the magnetisable particles within the packing material from the separating chamber within the second zone.

Since the chance of the packing material capturing a particle of a given size and magnetic susceptibility in a slurry is approximately inversely proportional to the linear velocity of the slurry, the fact that the linear velocity of the slurry decreases as it passes through the packing material will mean that the chance of small and/or weakly magnetisable particles being captured in the packing material will increase as the particles pass through the packing material. Thus, for a particular feed slurry to be treated to a particular purity utilizing a particular form of packing material and passing the slurry through the separating chamber at a particular rate, the length of the flow path through the packing material may be decreased in comparison with the apparatus of the prior art. Furthermore, since the packing material may extend substantially the full length of the canister and the slurry flows through the packing material in a general direction transverse to the axis of the canister, the cross-section of the packing material transverse to the direction of flow of the slurry may be relatively large. In such apparatus, the magnetisable particles will tend to be captured more evenly throughout the upstream and downstream regions of the packing material than is the case with the apparatus of the prior art. More particularly, those particles which are not easily captured in the packing material, that is the small and/or weakly magnetisable particles, tend to be captured in the downstream regions of the packing material due to the low velocity of the slurry in these regions, whilst those magnetisable particles which are easily captured, that is the large and/or strongly magnetisable particles, tend to be captured in the upstream regions of the packing material. Thus, for a particular throughflow rate of feed slurry, it is possible to maximize the length of time for which feed slurry may be passed through the separating chamber before the packing material requires regeneration. Alternatively, for a particular cycle time, it is possible to maximize the throughflow rate of feed slurry through the separating chamber.

The space filled by the packing material within the canister between the partitions may be of such a shape that the cross-sectional area of the packing material transverse to the general direction of flow of the fluid increases in the general direction of fluid flow, the density of the packing material being approximately constant. Alternatively, the arrangement of the packing material within the canister may be such that the packing density decreases in the general direction of flow of the fluid, the cross-sectional area of the space filled by the packing material transverse to the general direction of flow of the fluid being approximately constant. As a further alternative, if the packing material is filamentary or particulate, the cross-section of the filaments or the size of the particles may be decreased in the general direction of flow of the fluid. In this way, the linear velocity of the fluid decreases as it passes through the packing material. It is also possible to provide a combination of any of the above described alternatives. For example the packing density of the packing material could be varied at the same time as the cross-sectional area of the space filled by the packing material is varied.

In a preferred embodiment of the invention, the partitions within the separating chamber are in the form of two tubular partitions disposed one within the other, with their axes parallel to the axis of the separating chamber, the packing material being interposed between the two partitions. In such an embodiment the inlet and the outlet of the separating chamber are preferably such that fluid fed to the inlet passes along the inner of the two tubular partitions and thence through the wall of the inner partition, through the packing material and through the wall of the outer of the two tubular partitions to the outlet. The cross-sectional area of the packing material transverse to the direction of flow of the fluid will therefore increase in the direction of flow of the fluid, so that (assuming the packing material has a uniform packing density) the linear velocity of the fluid will decrease as it passes through the packing material. The packing material is preferably constituted by ferromagnetic steel wool. Preferably 90% to 98% of the total volume occupied by the packing material is void. Alternatively the packing material may be constituted by straight filaments, optionally tied together in bundles, extending substantially radially from the inner partition to the outer partition.

Advantageously the cross-sections of the inner and outer partitions are circular, the radius of the inner partition divided by the radius of the outer partition being between 0.15 and 0.50.

In a further embodiment of the invention, the partitions within the separating chamber are in the form of two pairs of planar partitions, each partition being disposed parallel to the other partitions and to the axis of the separating chamber, and the packing material being interposed between the two partitions of each pair. In such an embodiment the inlet and the outlet of the separating chamber are preferably such that fluid fed to the inlet passes along the two compartments defined between one of the partitions of each pair and the wall of the canister and thence through the wall of each of said one partition, through the packing material and through the wall of each of the other partitions of each pair of the outlet.

According to a second aspect of the invention, there is provided a method of separating magnetisable particles from a fluid in which they are suspended, which method comprises:

(a) establishing a magnetic field in a first zone;

(b) moving into the first zone a separating chamber in the form of an elongate canister having an inlet and an outlet and a fluid-permeable packing of magnetisable material disposed between at least two fluid-permeable partitions dividing the space within the canister into several compartments extending substantially the full length of the canister;

(c) passing a quantity of fluid containing magnetisable particles through the inlet of the separating chamber, through the packing material in a general direction transverse to the axis of the canister, to the outlet, with the linear velocity of the fluid decreasing as it passes through the packing material, so that magnetisable particles within the fluid are magnetised by the magnetic field and attracted to the packing material;

(d) moving the separating chamber out of the first zone into a second zone, out of the influence of the magnetic field in the first zone; and (e) removing the magnetisable particles within the packing material from the separating chamber within the second zone.

Such a method is particularly applicable to the separation of ferromagnetic and/or paramagnetic impurities from clay. More particularly it is applicable to the separation of magnetisable impurities from English china clay.

The packing material of the separating chamber may be of any of the known forms, although the most suitable form of packing material is a filamentary ferromagnetic material.

The apparatus of the present invention is particularly advantageous in the case in which the magnet is a superconducting electromagnet, since it is considerably more economical to operate such an electromagnet continuously rather than to repeatedly energise and de-energise the electromagnet. Furthermore it is advantageous for the apparatus to comprise more than one, and preferably two, separating chambers so that, whilst one separating chamber is within the first zone, a further separating chamber may be disposed in the second zone.

Conveniently the magnet is constituted by an electromagnet coil wound in the form of a solenoid. With such an arrangement it is preferred that the length of the solenoid should be much larger than its diameter. The canister of the separating chamber for use with such a magnet is preferably cylindrical, so that, when the separating chamber is in the first zone, the canister may be disposed within the electromagnet coil with its axis substantially parallel to that of the coil, so that, in use, the flow of slurry through the packing material will be transverse to the magnetic field applied to the separating chamber by the electromagnet coil. The magnetic field applied by the magnet may be between 1 Tesla and 10 Tesla and is preferably between 3 Tesla and 6 Tesla.

The rate at which the fluid containing magnetisable particles is passed through the separating chamber may be such that the velocity at which the fluid enters the packing material is between 50 and 2,500 cm/min, and is preferably between 60 and 1,500 cm/min. The volume of fluid containing magnetisable particles passed through the separating chamber in a single cycle may be between 5 and 8 times the void volume of the packing material, and is preferably 6 times the void volume.

BRIEF DESCRIPTION OF THE DRAWINGS

In order that the invention may be more fully understood, reference will now be made, by way of example, to the accompanying drawings, in which.

DETAILED DESCRIPTION OF DRAWINGS

Figure 1:
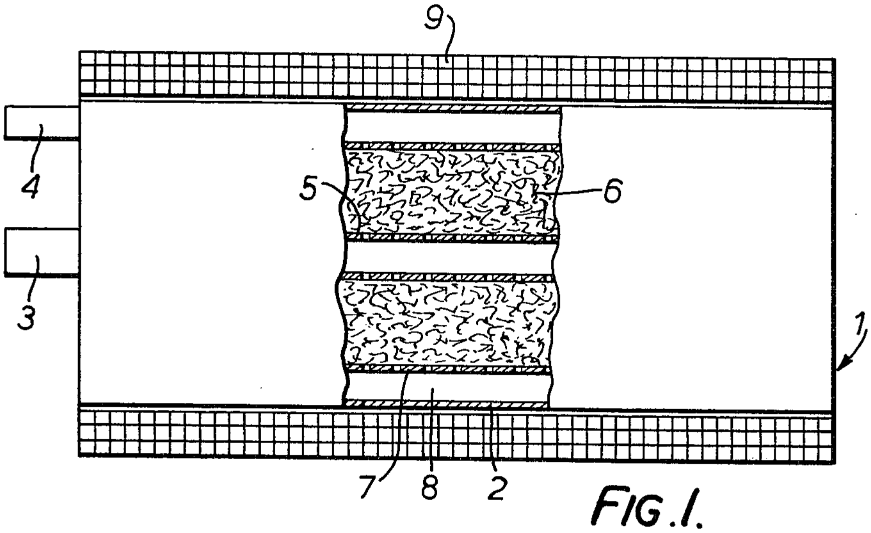
FIG. 1 shows a side view, partly in section, of a first embodiment of part of a magnetic separation apparatus according to the present invention.
Figure 2:
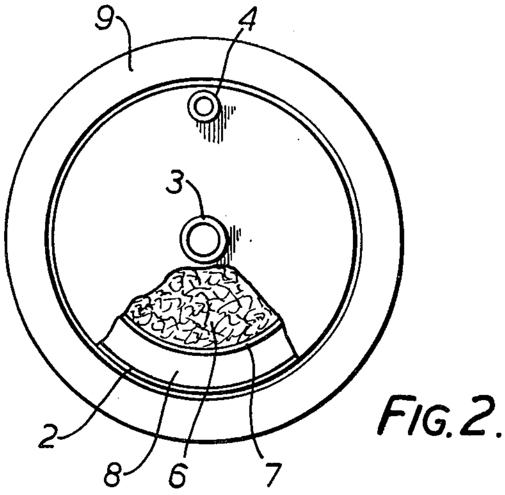
FIG. 2 shows an end view, partly in section, of the part of FIG. 1.

Referring to FIGS. 1 and 2, the part of the apparatus illustrated comprises a separating chamber 1 and a superconducting electromagnet coil 9. The separating chamber 1 comprises a cylindrical canister 2 made of non-magnetic material and provided with an inlet 3 for feed slurry and an outlet 4 for the magnetically treated slurry. The inlet 3 communicates with the space within an inner foraminous tubular partition 5 disposed within the canister 2 with its axis lying along the axis of the canister 2. Magnetisable material 6 consisting of corrosion-resistant ferromagnetic steel wool is packed within the canister 2 between the inner foraminous tubular partition 5 and an outer foraminous tubular partition 7, coaxial with the inner tubular partition 5. The annular space 8 between the outer tubular partition 7 and the curved wall of the canister 2 communicates with the outlet 4. The superconducting electromagnet coil 9 which is wound in the form of a solenoid surrounds the separating chamber 1.

In operation of the apparatus, feed slurry, for example a clay slurry, comprising suspension of a mixture of particles of relatively high and relatively low magnetic susceptibility is pumped through the inlet 3 to the space within the inner tubular partition 5 and flows through the holes in the inner tubular partition 5, through the magnetisable material in a generally radial direction, through the holes in the outer tubular member 7 and out through the outlet 4. While the slurry flows through the separating chamber 1, the electromagnet coil 9 is continuously energised to maintain a high intensity magnetic field in the region of the separating chamber 1 so that the magnetisable particles within the slurry are magnetised as they pass through the separating chamber and attracted to collecting sites within the magnetisable material. The linear velocity of the slurry decreases as it passes through the magnetisable material as the throughflow cross-section of the magnetisable material increases. Therefore the probability of the particles of relatively low magnetic susceptibility being captured within the magnetisable material will increase as the particles pass through the magnetisable material. The volumetric throughflow rate of the slurry through the separating chamber 1 is controlled so as to give a linear velocity of the slurry in the downstream region of the magnetisable material of a sufficiently low value to ensure that the particles of relatively low magnetic susceptibility are captured within the magnetisable material. Thus the bulk of the particles of relatively high magnetic susceptibility are captured in the upstream region of the magnetisable material, and the bulk of the particles of relatively low magnetic susceptibility are captured in the downstream region of the magnetisable material. When the proportion of magnetisable particles in the treated slurry emerging from the outlet 4 has risen above an acceptable level, the flow of feed slurry is stopped, and instead clean water is passed through the separating chamber 1 at the same volumetric flow rate and in the same direction as the feed slurry in order to remove substantially non-magnetisable particles which may have become physically entrained in the magnetisable material, the high intensity magnetic field being maintained in the region of the separating chamber 1 during this step. The separating chamber 1 is then removed from the zone of the high intensity magnetic field, and the residual magnetism within the magnetisable material 6 is reduced substantially to zero by subjecting the separating chamber 1 to the influence of a degaussing coil carrying an alternating current the amplitude of which is steadily reduced to zero. Clean water, at a higher pressure and volumetric flow rate than, but in the same direction as, the feed slurry is then passed through the separating chamber 1 to flush the captured magnetisable particles from the magnetisable material.

The steel wool constituting the magnetisable material preferably comprises a large number of randomly orientated ribbon-shaped filaments, the largest dimension of the cross-section of these filaments being between 20 and 250 microns, and preferably between 50 and 100 microns. When such a steel wool is packed so that it has a voltage of between 90 and 98%, and preferably approximately 95%, of the volume occupied by the material, it is found that the optimum throughput of slurry to obtain a particular separation is obtained if the inner radius of the magnetisable material divided by the outer radius of the magnetisable material is between 0.31 and 0.37, and most preferably this value is 0.34. Typically the canister of the separating chamber has a length of 3 feet (914 mm) and an inner diameter of 2 feet (610 mm).

Figure 3:
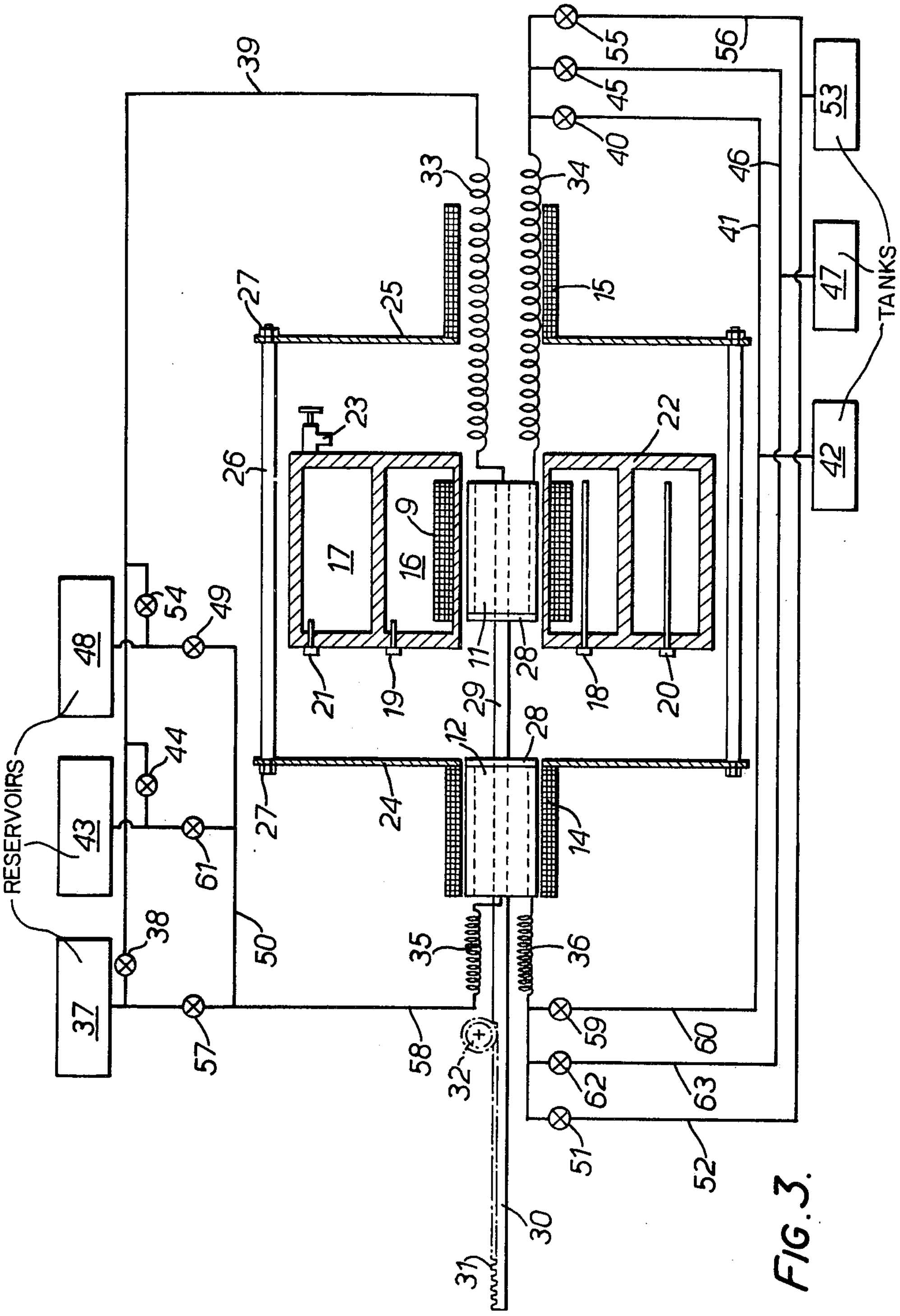
FIG. 3 is a diagrammatic representation of the magnetic separation apparatus.

The magnetic separation apparatus will now be described in more detail with reference to FIG. 3. The apparatus incorporates two separating chambers 11 and 12 of the type described above with reference to FIGS. 1 and 2. The separating chambers are movable between a first operative position and a second operative position. In the first operative position, the separating chamber 11 lies in the zone in which a high intensity magnetic field is established by means of the superconducting electromagnet coil 9, and the separating chamber 12 lies within a first degaussing coil 14. In the second operative position, the separating chamber 12 lies within the zone of high intensity magnetic field and chamber 11 lies within a second degaussing coil 15. The superconducting electromagnet coil 9 is surrounded by a first annular chamber 16 containing liquid helium which, in turn, is surrounded by a second annular chamber 17 containing liquid nitrogen. The chamber 16 is provided with an inlet conduit 18 for liquid helium and a vent 19 for helium vapor, and chamber 17 is provided with an inlet conduit 20 for liquid nitrogen and a vent 21 for the nitrogen vapour. Chambers 16 and 17 are both completely surrounded by a jacket 22 which is evacuated via a valve 23 which is connected to a suitable vacuum pump (not shown). All the walls of the chambers 16 and 17 and the jacket 22 are silvered on both sides to minimise the transmission of heat from the exterior.

Circular soft iron shields 24 and 25 are provided, one on each side of the refrigerated electromagnet assembly, and each has a central circular hole of diameter such that the separating chambers 11 and 12 will just slide through the hole. The soft iron shields are rigidly mounted by means of a plurality of threaded rods 26 which are secured to the shields by nuts 27. Each separating chamber is provided with a soft iron end wall 28, such that, when one of the separating chambers is within the zone of the high intensity magnetic field, the soft iron end wall 28 of the other separating chamber is co-planar with one of the two soft iron shields. The soft iron shields 24 and 25 and separating chamber end walls 28 serve to shield the separating chambers 11 and 12 from the intense magnetic field when either of the separating chambers is in the position in which the magnetisable material is substantially demagnetised. In addition these parts help to lessen the forces on the refrigerated electromagnet assembly when a separating chamber is removed from the zone of the high intensity magnetic field. The refrigerated electromagnet assembly is of relatively light construction and may be distorted by large forces. The forces acting on the assembly are largely balanced by ensuring that, as one separating chamber is withdrawn from the zone of high intensity magnetic field intensity, the other separating chamber enters that zone. The separating chambers 11 and 12 are rigidly connected together by means of a rod 29 and are moved between the first and second operative positions by a rod 30 which is provided with a rack 31 which co-operates with a pinion 32 which can be driven in either sense by means of an electric motor (not shown). Feed slurry is introduced into separating chamber 11 through a flexible hose 33 and magnetically treated slurry leaves the separating chamber 11 through a flexible hose 34. Corresponding flexible hoses 35 and 36 are connected to the separating chamber 12.

In operation, with the separating chambers in the first operative position, feed slurry flows from a reservoir 37, through a valve 38, a conduit 39 and the flexible hose 33 to the separating chamber 11 where magnetisable particles are extracted from the slurry and retained in the magnetisable material of the separating chamber. The slurry containing predominantly substantially non-magnetisable particles passes through the magnetisable material and leaves the separating chamber 11 through the flexible hose 34 whence it flows through a valve 40 and a conduit 41 into a tank 42. When the magnetisable material has become substantially saturated with collected magnetisable particles, the supply of feed slurry is interrupted by closing the valve 38, the valve 40 is closed, and clean water is allowed to flow at low pressure from a reservoir 43 through a valve 44 into the conduit 39 and the flexible hose 33, thus rinsing out the separating chamber 11, the magnetic field being maintained all the time by the electromagnet coil. The slurry of the substantially non-magnetisable particles passes out through the flexible hose 34, a valve 45 and a conduit 46 to a tank 47. This slurry is called the "middlings" fraction. While the operations of feeding and rinsing are being performed in the separating chamber 11, the separating chamber 12 is substantially demagnetised by supplying to the degaussing coil 14 an alternating current whose amplitude is steadily reduced to zero. Meanwhile clean water is supplied at high pressure from a reservoir 48 through a valve 49, a conduit 50 and a conduit 58 to the flexible hose 35. The water passes through the magnetisable material of the separating chamber 12 at high velocity and in the same direction as feed slurry is intended to pass through the separating chamber, thus scouring away the relatively strongly held magnetisable particles attracted to the magnetisable material. The slurry of magnetisable particles passes through the flexible hose 36, a valve 51 and a conduit 52 to a tank 53.

The separating chambers are then moved from the first operative position to the second operative position by rotating the pinion 32 anticlockwise. Separating chamber 11 now lies within the degaussing coil 15 and is substantially demagnetised by means of an alternating current whose amplitude is steadily reduced to zero. Meanwhile clean water at high pressure is passed through the magnetisable material within this separating chamber 11 from the reservoir 48 via a valve 54, the conduit 39 and the flexible hose 33. The slurry of magnetisable particles leaves the separating chamber 11 through the flexible hose 34, a valve 55 and a conduit 56, and enters the tank 53. Feed slurry enters separating chamber 12 within the zone of high intensity magnetic field from the reservoir 37 via a valve 57, the conduit 58 and the flexible hose 35. The slurry of substantially non-magnetisable particles passes through the flexible hose 36, a valve 59 and a conduit 60 to enter the tank 52. Rinsing water flows from the reservoir 43, through a valve 61, the conduit 50, the conduit 58 and the flexible hose 35. The slurry of substantially non-magnetisable particles, or the "middlings" fraction, leaves through the flexible hose 36, a valve 62 and a conduit 63, and enters the tank 47.

EXAMPLE

An English china clay, having a particle size distribution such that 44% by weight consisted of particles having an equivalent spherical diameter less than 2 microns and 12% by weight consisted of particles having an equivalent spherical diameter greater than 10 microns, was mixed with water containing 0.2% by weight of sodium silicate, based on the weight of clay, and sufficient sodium hydroxide to raise the pH to 9.0 in order to deflocculate the clay. The amount of water was such as to form a suspension containing 11.2% by weight of dry solids, that is 120Kg. of solids per cubic meter of suspension. The initial brightness of the clay, that is the percentage reflectance of violet light of wavelength 458 nm from the dry clay powder, was 84.8.

The suspension was passed through magnetic separation apparatus as described above. The superconducting electromagnet provided a magnetic field of intensity 4.96 Tesla and had a central bore of a sufficiently large diameter to accomodate cylindrical separating chambers of inner diameter 610 mm and length, L, 914mm. The time taken to substitute one separating chamber for the other was 10 seconds. The outer radius, $r_1$ of the inner tubular partition 5 was 76.2 mm and the inner radius $r_2$ of the outer tubular partition 7 was 292.1 mm. The magnetisable material 6 consisted of steel wool packed to a density such that 95% by volume of the total space occupied by the magnetisable material was void.

It was aimed to remove sufficient discolouring magnetisable impurities from the clay to improve the brightness by 3.0 units and it was found by experiment that this could be achieved by passing the suspension through the separating chamber at an average linear velocity, $\overline{V}$ of 2.59 meters per minute.

The linear velocity $V_1$ of the suspension as it enters the magnetisable material is given by the expression:

$$V_1 = \overline{V}\frac{(r_1 + r_2)}{2r_1} = 6.26 \text{ meters per minute}$$

The volume of suspension passed through the separating chamber per unit time, F, is given by the expression:

$$F = 2\,\pi \cdot r_1 \cdot LV_1 = 2.74 \text{ cubic meters per minute.}$$

It was found by experiment that the optimum recovery of refined clay was achieved when the flow of feed suspension through the separating chamber was halted after the total volume of suspension passed through the separating chamber had reached six times the void volume of the magnetisable material in the separating chamber. The recovery of refined clay under these conditions was 91% by weight. The separating chamber was washed out with a volume of clean water equal to the void volume and at the same flow rate as the clay suspension. The proportion of a cycle, D, for which feed slurry flowed is therefore given by the expression:

$$D = \frac{6T_1}{7T_1 + 0.167}$$

where $T_1$ is the time in minutes for a volume of liquid equal to the void volume of the magnetisable material to flow through the separating chamber, and is given by the expression:

$$T_1 = \frac{0.95\,\pi\,(r_2^2 - r_1^2)\,L}{F} = 0.0792 \text{ minutes and } D = 0.659.$$

The production rate, P, of refined clay is therefore given by the expression:

$$P = W_uFRD$$

where $W_u$ is the weight of dry clay per unit volume of suspension = 120 $Kgm^{-3}$ $R$ is the recovery of refined clay = 0.91

Therefore

P = 197.2 Kg/minute

= 11.8 tonnes per hour.

By comparison a magnetic separation apparatus of the type particularly described in German Offenlegungsschrift No. 24 33 008 having two separating chambers, with the same outside dimensions but of internal construction such that the feed suspension flows through the magnetisable material in an axial direction, refined the same clay to give a brightness improvement of 3.0 units at the same magnetic field intensity at a maximum production rate of 5.16 tonnes per hour.

Figure 4:
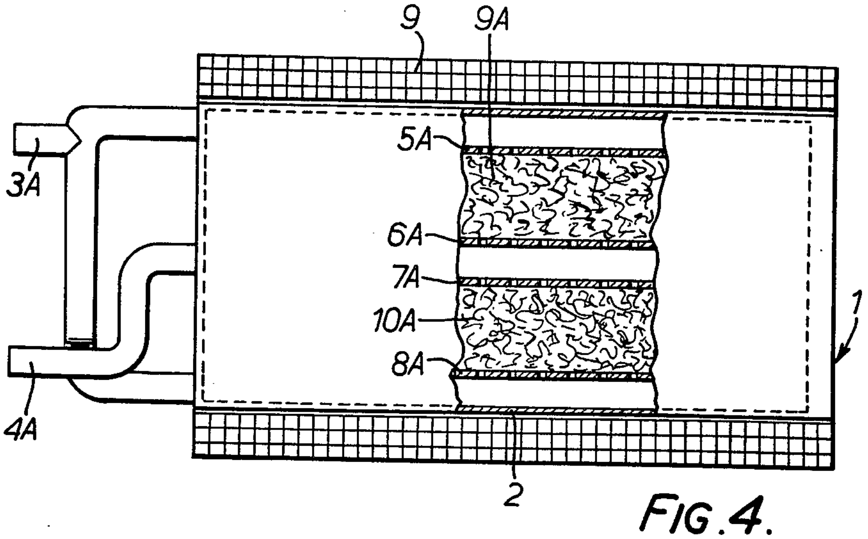
FIG. 4 shows a side view, partly in section, of a second embodiment of part of the magnetic separation apparatus.
Figure 5:
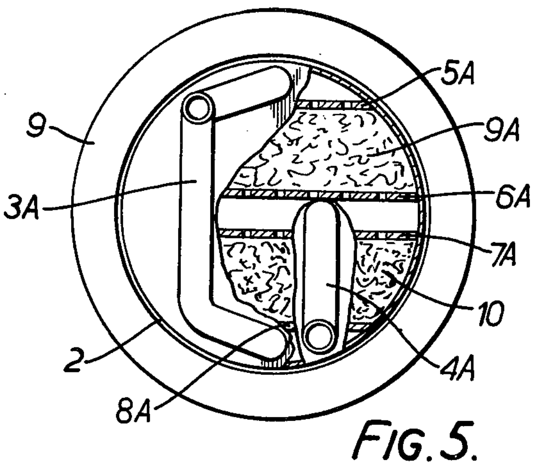
FIG. 5 shows an end view, partly in section, of the part of FIG. 4.

An alternative embodiment of the part of the apparatus shown in FIGS. 1 and 2 is illustrated in FIGS. 4 and 5. The part again comprises a separating chamber 1 and a superconductive electromagnet coil 9. The separating chamber 1 again comprises a cylindrical canister 2 made of non-magnetic material, the canister being provided with an inlet manifold 3A for feed slurry and an outlet 4A for magnetically treated slurry. The interior of the canister 2 is divided into five compartments by means of lateral foraminous partitions 5A, 6A, 7A and 8A. The compartment defined by partition 5A and the inside wall of the canister 2 and the compartment defined by partition 8A and the inside wall of the canister 2 communicate with the inlet manifold 3A and serve to distribute incoming feed slurry along the length of the canister. Between partitions 5A and 6A there is accommodated a magnetisable material 9A consisting of corrosion-resistant ferromagnetic steel wool, the shape of the compartment being such that the cross-sectional area increases in the direction in which the slurry flows through the magnetisable material, so that the linear velocity of flow of the slurry as it passes through the magnetisable material decreases. Between partitions 7A and 8A there is accommodated magnetisable material 10 similar to the magnetisable material 9A in both shape and consistency. After passing through the magnetisable material, the slurry enters a central compartment defined by the partitions 6A and 7A and thence passes out of the canister 2 through the outlet 4A.

The above described separating chamber permits a high volumetric throughflow rate of slurry and enables the magnetisable particles in the slurry to be captured in a favourable position in the magnetisable material of the separating chamber for easy removal by flushing with a fluid.

Assuming that the canister of the separating chamber again has a length of 3 feet and an inner diameter of 2 feet, the partitions 5A and 8A may each be placed at a perpendicular distance of 10½ inches (267 mm) from the axis of the canister and the partitions 6A and 7A may each be placed at a perpendicular distance of 1½ inches (37 mm) from the axis of the canister. In a separating chamber having such dimensions, the width of the partitions 5A and 8A will be approximately 0.97 feet (296 mm) and the width of the partitions 6A and 7A will be 1.99 feet (606 mm). Therefore the ratio of the flow rate of a fluid when it enters the packing material and its flow rate when it leaves the packing material should theoretically be 2.05 in such a separating chamber. The parameters of the separating chamber should preferably lie between the following two extremes:

| perpendicular distance of partitions 5 and 8 from axis ins. (mm) | perpendicular distance of partitions 6 and 7 from axis ins. (mm) | width of partitions 5 and 8 feet (mm) | width of partitions 6 and 7 feet (mm) | input/output flow ratio |
|---|---|---|---|---|
| 11 (289) | ½ (13) | 0.80 (610) | 2.00 (610) | 2.50 |
| 9 (228) | 3 (76) | 1.08 (329) | 1.95 (595) | 1.81 |

Figure 6:
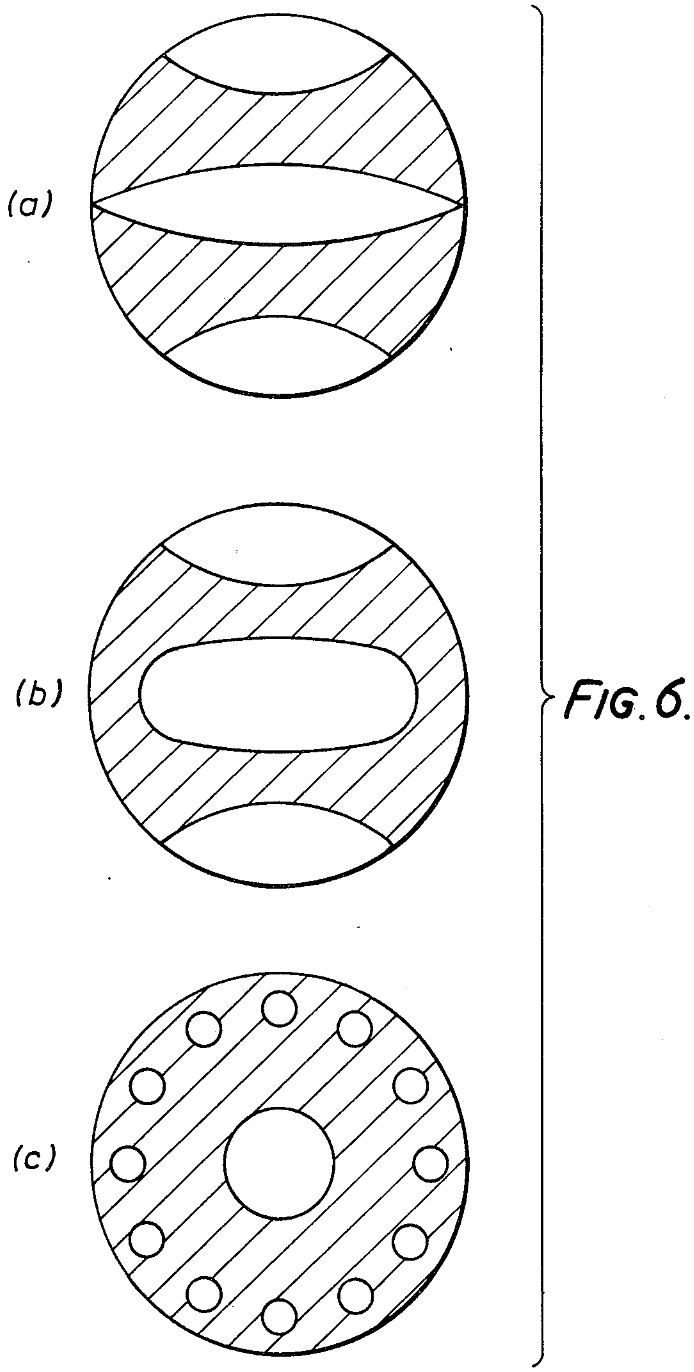
FIG. 6 shows diagrammatic cross-sections of further possible embodiments of part of the apparatus.

It should be understood that many other configurations of separating chamber within the magnetic separation apparatus are possible within the scope of this invention besides those described with reference to FIGS. 1 and 2 and FIGS. 4 and 5. FIG. 6 of the accompanying drawings shows cross-sections transverse to the axes of three further possible configurations (a) to (c) of separating chamber.

A slurry of English china clay generally contains a mixture of large magnetisable particles (having an equivalent spherical diameter greater than 10 microns) and small magnetisable particles (having an equivalent spherical diameter less than 10 microns). The magnetisable particles range from magnetite particles having a mass magnetic susceptibility between approximately $10^{-3}$ and $3.10^{-2}$ (in S.I. units) to haematite particles having a mass magnetic susceptibility of approximately $2.10^{-5}$ (in S.I. units).

I claim:

1. In a moving matrix magnetic separator for separating magnetisable particles from a fluid by means of a magnetic field, an elongate separating chamber movable into and out of the magnetic field, the longitudinal axis of said separating chamber being parallel to the direction of movement, said separating chamber having an input, an output and two fluid permeable partitions for defining three compartments within said separating chamber each extending substantially the full length of the separating chamber, one of said compartments being an input compartment having said input connected thereto, a second of said compartments being an output compartment having said output connected thereto, and a third of said compartments being a separating compartment, said separating compartment being positioned between said input compartment and said output compartment, and including walls formed by said two fluid permeable partitions, said separating compartment having a fluid permeable matrix means of magnetisable material therein, said matrix means being arranged such that the linear velocity of fluid flow through said matrix means decreases as the fluid passes therethrough as a function of the distance the fluid has travelled therein.

2. A separating chamber according to claim 1, wherein the density of the matrix means decreases in the direction in which fluid supplied to the input flows through the matrix means.

3. A separating chamber according to claim 1, wherein the material of the matrix means is filamentary or particulate and the cross-section of the filaments or the size of the particles decreases in the direction in which fluid supplied to the input flows through the matrix means.

4. A separating chamber according to claim 1, wherein the cross-sectional area of the matrix means transverse to the direction in which fluid supplied to the input flows through the matrix means decreases in that direction.

5. A separating chamber according to claim 4, wherein the partitions are in the form of two pairs of planar partitions and each of the partitions is disposed parallel to each other and to the longitudinal axis of the separating chamber, a respective pair of partitions being disposed on opposite sides of the input compartment which extends along the longitudinal axis of the separating chamber, a respective matrix means of magnetisable material being disposed between the partitions of each pair, and a respective output compartment being partially delimited by the outer partition of each pair.

6. A separating chamber according to claim 5, wherein a single input extends through a central region of one end of the separating chamber and two outputs extend through peripheral regions of the same end of the separating chamber and each open into a respective one of the output compartments.

7. A separating chamber according to claim 6, wherein the matrix means is constituted by ferromagnetic steel wool.

8. A separating chamber according to claim 4, wherein the partitions are in the form of two tubular partitions disposed one within the other with their axes coincident with the longitudinal axis of the separating chamber, the inner partition surrounding the input compartment and the output compartment surrounding the outer partition.

9. A separating chamber according to claim 8, wherein a single input extends through a central region of one end of the separating chamber and a single output extends through a peripheral region of the same end of the separating chamber.

10. A separating chamber according to claim 8, wherein the matrix means is constituted by ferromagnetic steel wool.

11. A separating chamber according to claim 10, wherein the largest dimension of the cross-section of the filaments of the matrix means is between 20 and 250 microns.

12. A separating chamber according to claim 11, wherein 90 to 98% of the total volume occupied by the matrix means is void.

13. A separating chamber according to claim 8, wherein the matrix means is constituted by straight filaments extending substantially from the inner partition to the outer partition.

14. A separating chamber according to claim 8 wherein the cross-sections of the inner and outer partitions are circular, the radius of the inner partition divided by the radius of the outer partition being between 0.15 and 0.50.

15. A separating chamber according to claim 8, wherein the radius of the inner partition divided by the radius of the outer partition is between 0.30 and 0.40.

16. A moving matrix magnetic separator comprising:

(a) a superconducting electromagnet for establishing a magnetic field in a first zone;

(b) two elongate separating chambers movable into and out of the first zone with their longitudinal axes parallel to the direction of movement, each of said separating chambers having an input, an output and two fluid permeable partitions for defining three compartments within said separating chamber each extending substantially the full length of the separating chamber, one of said compartments being an input compartment having said input connected thereto, a second of said compartments being an output compartment having said output connected thereto, and a third of said compartments being a separating compartment, said separating compartment being positioned between said input compartment and said output compartment, and including walls formed by said two fluid permeable partitions which are tubular and coaxial with the separating chamber, said separating compartment having a fluid permeable matrix means of magnetisable material therein, said matrix means being arranged such that the linear velocity of fluid flow through said matrix means decreases as the fluid passes therethrough as a function of the distance the fluid has travelled therein;

(c) means for supplying fluid having magnetisable particles suspended therein to the input of a separating chamber, when that separating chamber is within the first zone, so that magnetisable particles are magnetised by the magnetic field and attracted to the matrix means;

(d) means for moving the separating chambers reciprocatingly into and out of the first zone; and (e) means for removing the magnetisable particles attracted to the matrix means from a separating chamber outside the first zone.

17. A method of separating magnetisable particles from a fluid in which they are suspended, which method comprises:

(a) establishing a magnetic field in a first zone;

(b) moving into the first zone a separating chamber in the form of an elongate canister, the longitudinal axis of said separating chamber being parallel to the direction of movement, said separating chamber having an input, an output and two fluid permeable partitions for defining three compartments within said separating chamber each extending substantially the full length of the separating chamber, one of said compartments being an input compartment having said input connected thereto, a second of said compartments being an output compartment having said output connected thereto, and a third of said compartments being a separating compartment said separating compartment being positioned between said input compartment and said output compartment, and including walls formed by said two fluid permeable partitions, said separating compartment having a fluid permeable matrix means of magnetisable material therein, said matrix means being arranged such that the linear velocity of fluid flow through said matrix means decreases as the fluid passes therethrough;

(c) passing a quantity of fluid containing magnetisable particles through the input into said input compartment, then through one of said two fluid permeable partitions into the separating compartment wherein the linear velocity of the fluid decreases as the fluid passes through the matrix means in the separating compartment, then through a second of the two said fluid permeable partitions into the output compartment and then through the output in the output compartment;

(d) moving the separating chamber out of the first zone into a second zone, out of the influence of the magnetic field in the first zone; and (e) removing the magnetisable particles within the packing material from the separating chamber within the second zone.

18. A method according to claim 17, wherein the rate at which fluid containing magnetisable particles is passed through the separating chamber is such that the velocity at which the fluid enters the matrix means is between 50 and 2,500 cm/min.

19. A method according to claim 17, wherein the rate at which fluid containing magnetisable particles is passed through the separating chamber is such that the velocity at which the fluid enters the matrix means is between 60 and 1,500 cm/min.

20. A method according to claim 17, wherein the magnetic field established in the first zone has a magnitude of between 1 and 10 Tesla.

21. A method according to claim 17, wherein the magnetic field established in the first zone has a magnitude of between 3 and 6 Tesla.

22. A method according to claim 17, wherein the volume of said fluid containing magnetisable particles passed through the separating chamber in a single cycle is between 5 and 8 times the void volume of the matrix means.

23. A method according to claim 17, the method being used for the separation of ferromagnetic and/or paramagnetic impurities from clay.

* * * * *